United States Patent
Xiao et al.

(10) Patent No.: US 10,682,684 B2
(45) Date of Patent: Jun. 16, 2020

(54) HYBRID WORKPIECE JOINING

(71) Applicant: GM GLOBAL TECHNOLOGY OPERATIONS LLC, Detroit, MI (US)

(72) Inventors: Guoxian Xiao, Troy, MI (US); Dalong Gao, Rochester, MI (US); Jorge F. Arinez, Rochester Hills, MI (US); Ningjian Huang, Bingham Farms, MI (US); Pei-chung Wang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 495 days.

(21) Appl. No.: 15/371,695

(22) Filed: Dec. 7, 2016

(65) Prior Publication Data
US 2018/0154426 A1    Jun. 7, 2018

(51) Int. Cl.
| | |
|---|---|
| *B23K 20/00* | (2006.01) |
| *B21J 15/02* | (2006.01) |
| *B21J 15/04* | (2006.01) |
| *B23K 20/12* | (2006.01) |
| *B23K 20/22* | (2006.01) |
| *B23K 103/18* | (2006.01) |

(52) U.S. Cl.
CPC ........... *B21J 15/027* (2013.01); *B21J 15/043* (2013.01); *B23K 20/1295* (2013.01); *B23K 20/22* (2013.01); *B23K 2103/18* (2018.08)

(58) Field of Classification Search
CPC ........... B21J 15/36; B21J 15/08; B23K 20/12; B23K 20/127; B23K 20/1295; B23K 11/0066
See application file for complete search history.

(56) References Cited

U.S. PATENT DOCUMENTS

| | | |
|---|---|---|
| 6,836,948 B2 | 1/2005 | Wang |
| 6,988,651 B2 | 1/2006 | Stevenson et al. |
| 7,267,736 B2 | 9/2007 | Hou et al. |
| 7,993,537 B2 | 8/2011 | Hector, Jr. et al. |
| 8,250,728 B2 | 8/2012 | Stevenson et al. |
| 8,747,105 B2 | 6/2014 | Nordh |
| 8,747,606 B2 | 6/2014 | Xie et al. |

(Continued)

FOREIGN PATENT DOCUMENTS

| | | |
|---|---|---|
| CN | 103240564 A | 8/2013 |
| DE | 102011109815 | 2/2013 |
| EP | 1503089 A1 | 2/2005 |

OTHER PUBLICATIONS

German Office Action dated Mar. 1, 2019 cited in Application No. 10 2017 129 071.0, 5 pgs. (GMC0291DE).

*Primary Examiner* — Erin B Saad
(74) *Attorney, Agent, or Firm* — Cantor Colburn LLP

(57) ABSTRACT

A method for joining a plurality of workpieces includes providing a rotating drive tool. A fastener is secured to the drive tool. The drive tool is then rotatably driven such that a distal end of the fastener rotates against a surface of the plurality of workpieces. A heated material zone is then generated on the plurality of workpieces as caused by friction from the rotation of the fastener against the surface of the plurality of workpieces. The distal end of the fastener is rotatably and axially driven through the heated material zone. Finally, the drive tool is removed from the fastener, such that when the heated material zone cools, a portion of the heated material zone is fused to the fastener.

10 Claims, 4 Drawing Sheets

(56) References Cited

U.S. PATENT DOCUMENTS

| | | |
|---|---|---|
| 2003/0136810 A1 | 7/2003 | Stevenson et al. |
| 2003/0192940 A1 | 10/2003 | Stevenson et al. |
| 2003/0201306 A1* | 10/2003 | McTeman ............... B23K 20/12 |
| | | 228/112.1 |
| 2007/0044292 A1* | 3/2007 | Stevenson ............... B21J 15/043 |
| | | 29/524.1 |
| 2007/0116538 A1 | 5/2007 | Wang et al. |
| 2009/0065484 A1 | 3/2009 | Wang et al. |
| 2013/0122246 A1 | 5/2013 | Berger et al. |
| 2015/0053328 A1 | 2/2015 | Wang et al. |
| 2015/0068662 A1 | 3/2015 | Wang |
| 2015/0143686 A1 | 5/2015 | Blacket et al. |
| 2015/0306697 A1 | 10/2015 | Xiao et al. |
| 2015/0306862 A1 | 10/2015 | Xiao et al. |
| 2016/0091009 A1* | 3/2016 | Wang .................... B21J 15/147 |
| | | 29/524.1 |
| 2016/0332215 A1* | 11/2016 | Blacket ................. B21D 39/03 |
| 2018/0021883 A1 | 1/2018 | Werkmeister et al. |

* cited by examiner

HYBRID WORKPIECE JOINING

FIELD

The present disclosure relates to a workpiece assembly including a fastener and a joining method thereof.

INTRODUCTION

The statements in this section merely provide background information related to the present disclosure and may not constitute prior art.

Joining of both ferrous and non-ferrous materials can be achieved through various methods. In one example for joining overlapping members, a fastener can be driven under pressure into the members. A die or mandrel may disrupt a terminal end of the fastener in order to create a mechanical interference between the members and the fastener. In another example for joining overlapping members, an ultrasonic welding device can use high-frequency ultrasonic vibrations to generate heat at an interface of the workpieces. The heated workpieces may melt sufficiently to create a joint at the interface.

SUMMARY

A method for joining a plurality of workpieces includes providing a rotating drive tool. A fastener is secured to the drive tool. The drive tool is then rotatably driven such that a distal end of the fastener rotates against a surface of the plurality of workpieces. A heated material zone is then generated on the plurality of workpieces as caused by friction from the rotation of the fastener against the surface of the plurality of workpieces. The distal end of the fastener is rotatably and axially driven through the heated material zone. Finally, the drive tool is removed from the fastener, such that when the heated material zone cools, a portion of the heated material zone is fused to the fastener.

A hybrid joining system includes a rotating drive tool, a fastener received by the drive tool at a proximal end of the fastener, and a die coaxially aligned with the drive tool. The fastener is rotatably driven by the drive tool such that a distal end of the fastener rotates against a surface of a material assembly. Furthermore, friction caused by the rotation of the fastener against the material assembly generates a heated material zone on the material assembly. The rotating drive tool rotatably and axially drives the distal end of the fastener through the heated material zone and into the die. Additionally, at least a portion of the heated material zone is deformed by the die.

A hybrid joining system includes a rotating drive tool having a stem portion and a mandrel head and a fastener having a hollow shank. The stem portion of the drive tool extends through the hollow shank of the fastener with the mandrel head arranged at a distal end thereof. The fastener is rotatably driven by the drive tool such that a distal end of the fastener rotates against a surface of a material assembly. Furthermore, friction caused by the rotation of the fastener against the material assembly generates a heated material zone on the material assembly. The rotating drive tool rotatably and axially drives the distal end of the fastener through the heated material zone. Additionally, at least a portion of the heated material zone is deformed by the mandrel head.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 6:
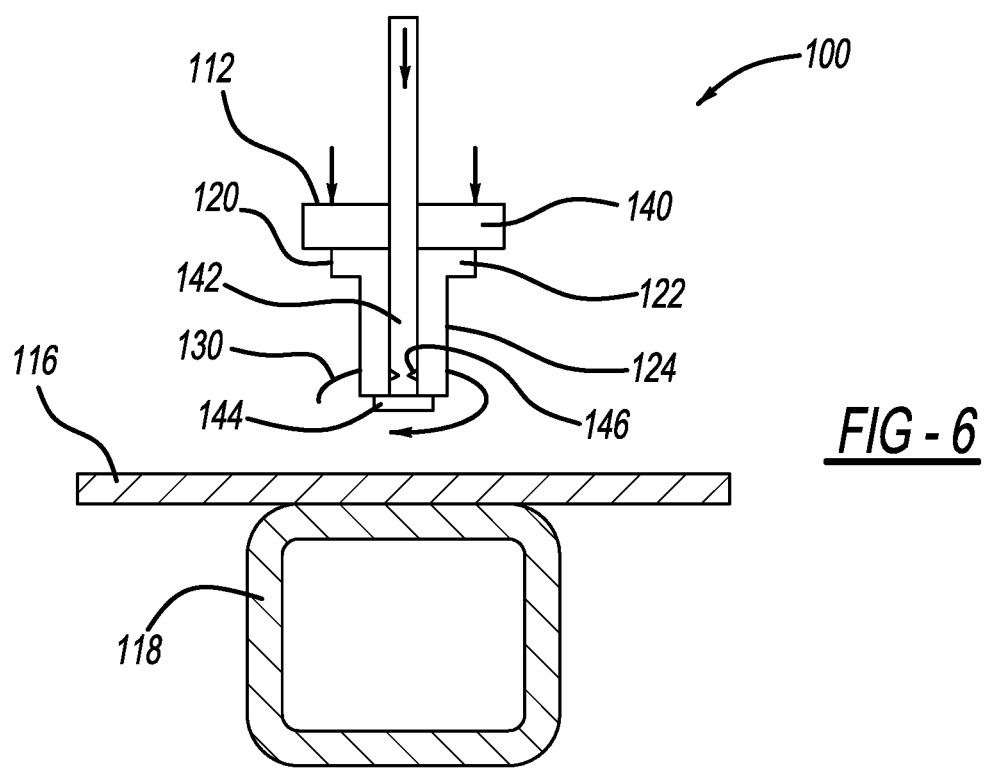
FIG. 6 is a schematic view of another exemplary hybrid joining machine for use in a hybrid joining process according to the present disclosure.
Figure 7:
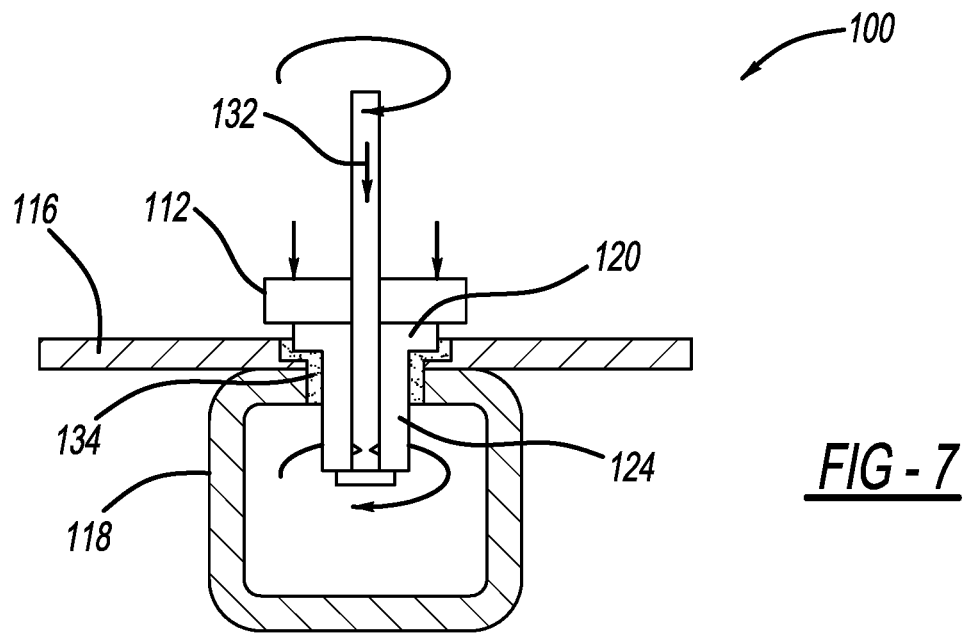
Figure 8:
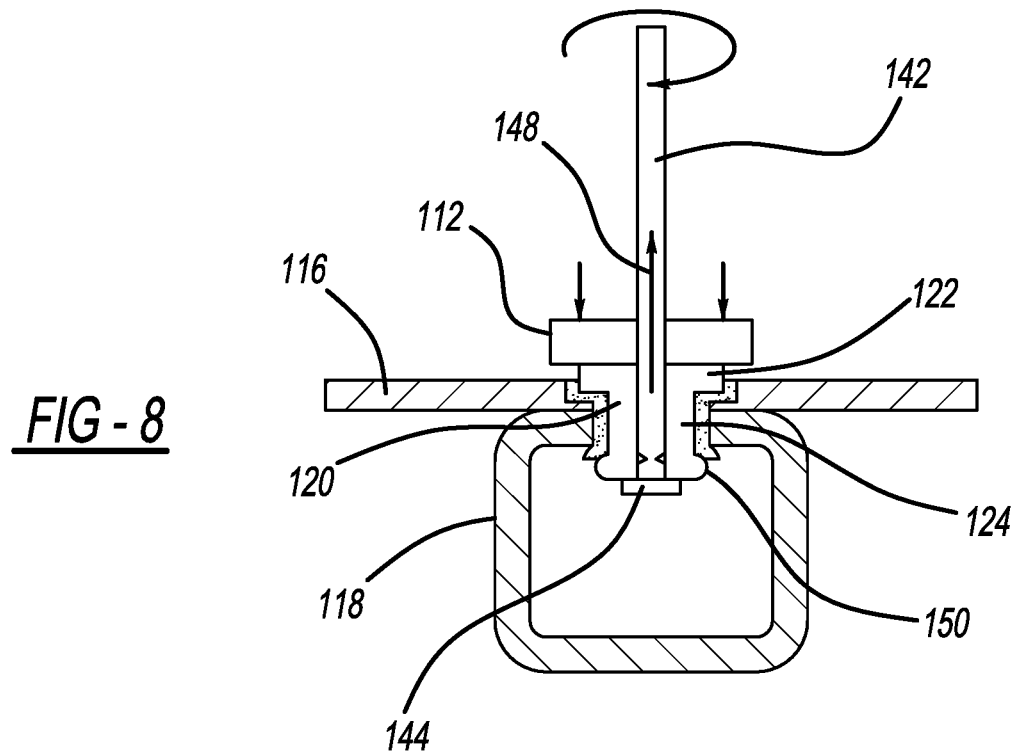
Figure 9:
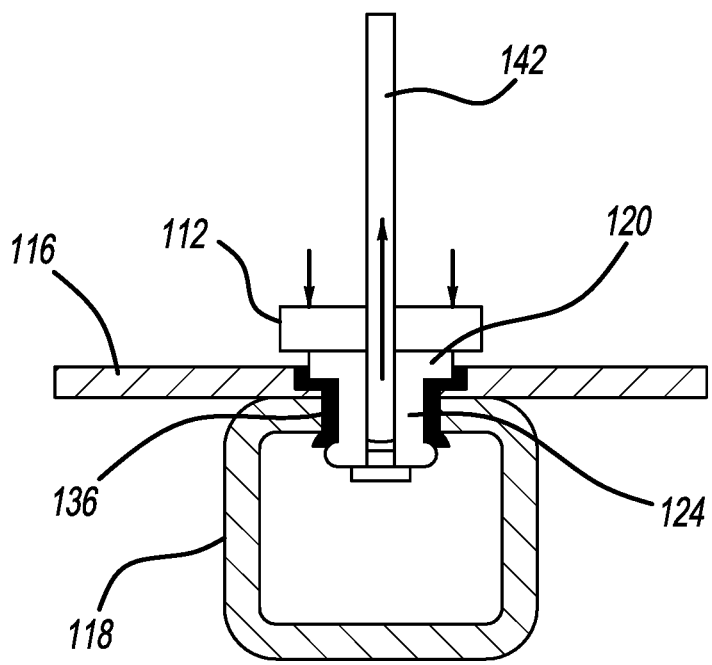
Figure 10:
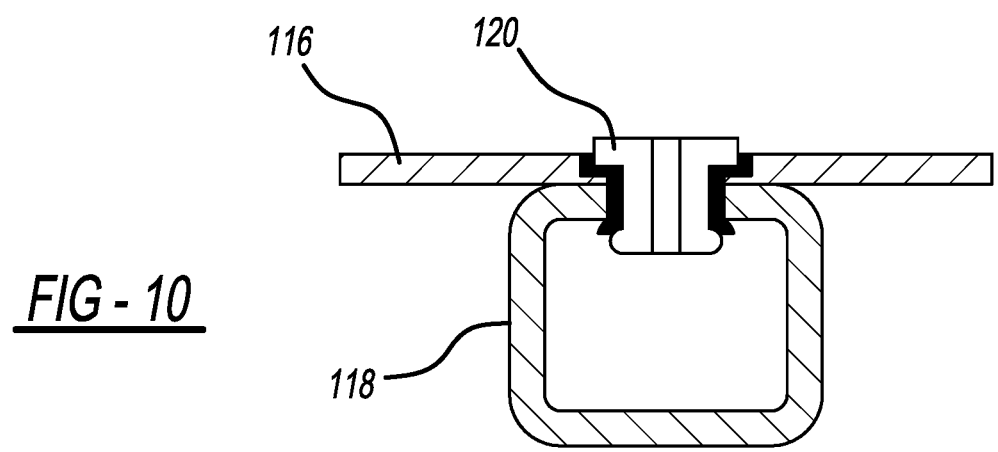

FIGS. 7, 8, and 9 are schematic views of the exemplary hybrid joining machine of FIG. 6 during the joining process; and FIG. 10 is a schematic view of a joint formed by the hybrid joining machine using the hybrid joining process according to the present disclosure.

DETAILED DESCRIPTION

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

The present disclosure describes a hybrid technique for joining workpieces, such as polymeric composites, by a combination of friction stir riveting and material fusing. With reference to the drawings, wherein like reference numbers refer to like components, each of the exemplary hybrid joining machines includes a friction stir tool 12 and a lower die 14. The hybrid joining machines of the present invention may be utilized with various styles of spot welding devices (e.g., C gun type, X gun type, pogo type). The hybrid joining machines can be used to join first and second workpieces 16, 18 with a fastener 20. In one exemplary embodiment shown in FIG. 1, the fastener 20 can be a rivet having a head portion 22 and a generally cylindrical shank 24. The fastener 20 is configured to mechanically fasten the first and second workpieces 16, 18 when subjected to a rotating driving force, such as may be achieved by the friction stir tool 12 acting on the fastener 20. The high speed spin of the fastener 20 generates heat at the workpieces 16, 18, allowing the shank 24 of the fastener 20 to penetrate the workpieces 16, 18 under the force of the friction stir tool 12. Furthermore, the shank 24 is configured to deform to create a mechanical joint without requiring a lead hole for the fastener 20 in the workpieces 16, 18. The hybrid joining process disclosed herein, improves process robustness while reducing weight. The formed joint has increased shear and peel strength over conventional methods.

Figure 1:
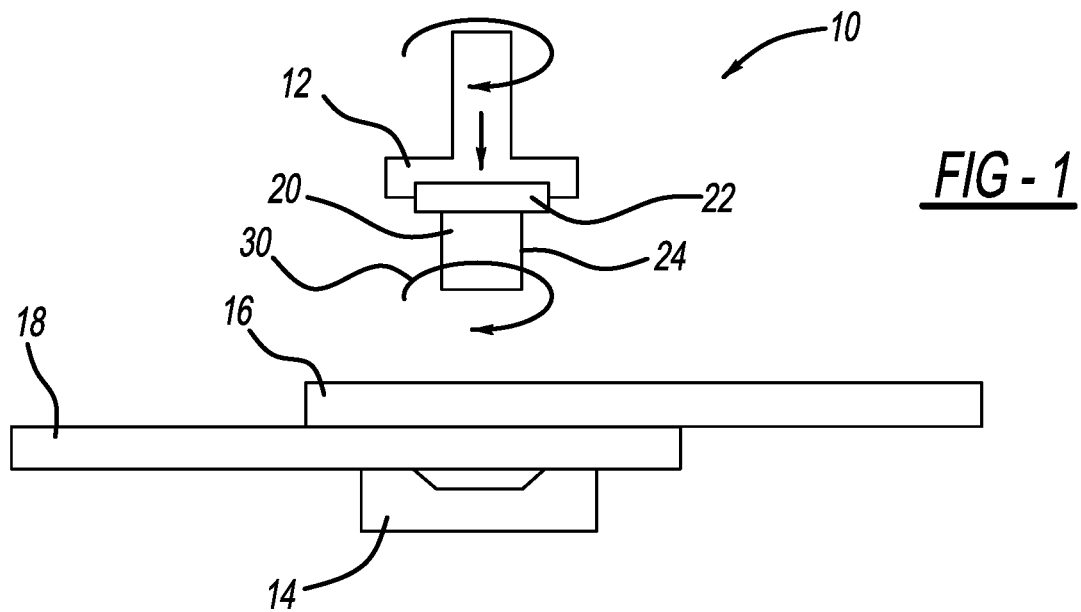
FIG. 1 is a schematic view of an exemplary hybrid joining machine for use in a hybrid joining process according to the present disclosure.
Figure 2:
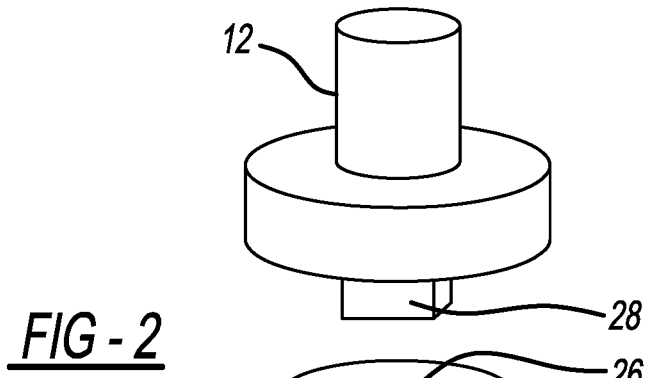
FIG. 2 is a perspective view of a friction stir tool and a fastener for use in the hybrid joining process according to the present disclosure.

A method of joining the workpieces 16, 18 will be described with respect to the hybrid joining machine 10 of FIG. 1. Specifically, first and second workpieces 16, 18 are arranged on the lower die 14 such that the second, lower workpiece 18 rests directly on the lower die 14 and the first, upper workpiece 16 rests on the lower workpiece 18. The friction stir tool 12 is securely held in a powered friction stir machine (not shown) and is adapted to locate the shank 24 of the fastener 20 against one or more surfaces of the workpieces 16, 18. The head 22 of the fastener 20 includes a driven feature 26 for mating with a driving feature 28 of the friction stir tool 12 (see FIG. 2). The friction stir tool 12 is positioned in an attitude with a rotational axis of the tool aligned generally perpendicular to a spot weld site on the workpieces 16, 18. The friction stir machine is adapted to rotate the friction stir tool 12 with a high speed spin as indicated by the rotational arrow 30 (e.g., with a rotational speed of 1600 RPM). The friction stir machine advances the tool 12 and the driving feature 28 drives the driven feature 26 on the head 22 of the fastener 20.

Figure 3:
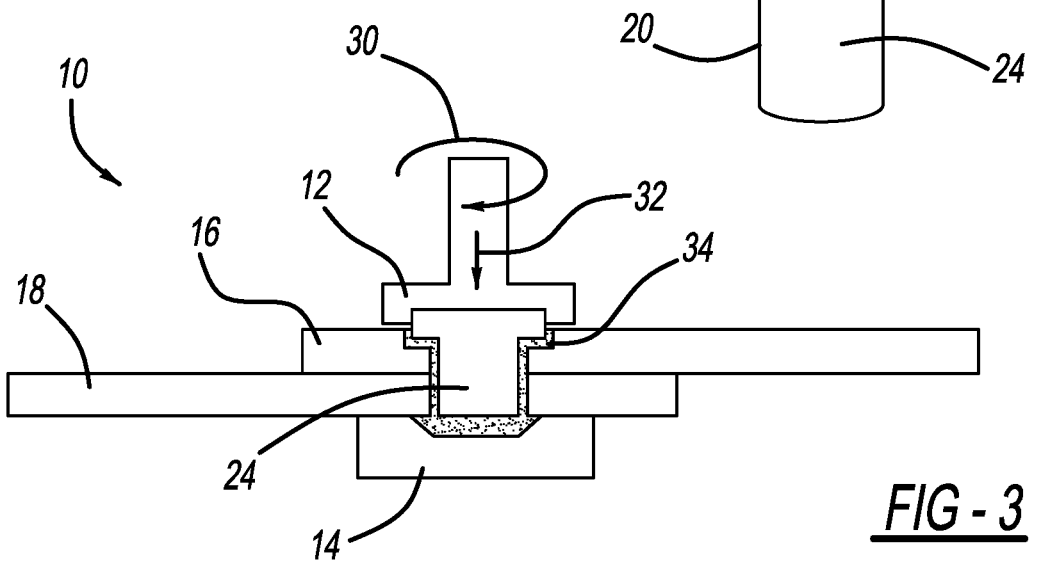
FIGS. 3 and 4 are schematic views of the exemplary hybrid joining machine of FIG. 1 during the joining process.

With reference now to FIG. 3, the stir machine continues to advance the tool 12 so that the rotating shank 24 of the fastener 20 frictionally engages the workpiece 16 and generates heat at the surface thereof. The tool 12 may press the fastener 20 into the workpieces 16, 18 with a force (e.g., approximately 900 N), such as shown by directional arrow 32. It should be noted that other drive mechanisms may also be used for driving the fastener 20 into the workpieces 16, 18 (e.g., an electrically or hydraulically powered screw assembly, an actuator). The frictional contact between the rotating shank 24 and the stationary material of the respective workpieces 16, 18 generates intense local heating, such that the engaged material is plasticized at a localized heated material zone 34. The plasticized material allows the shank 24 of the fastener 20 to easily penetrate the workpieces 16, 18, but also allows the material of the workpieces 16, 18 to fuse to the shank 24. When the shank 24 of the fastener 20 extends completely through the workpieces 16, 18, the tool 12 continues spinning the fastener 20 and generating heat. At the same time, the tool 12 presses the fastener 20 into the lower die 14. Notably, the localized heated material zone 34 around the fastener 20 allows for enhanced riveting since local stresses and friction in this material zone are reduced. Furthermore, the surface of the die 14 has low surface energy, so the molten material will not stick thereto. Conversely, a release agent can be used to enhance part release.

Figure 4:
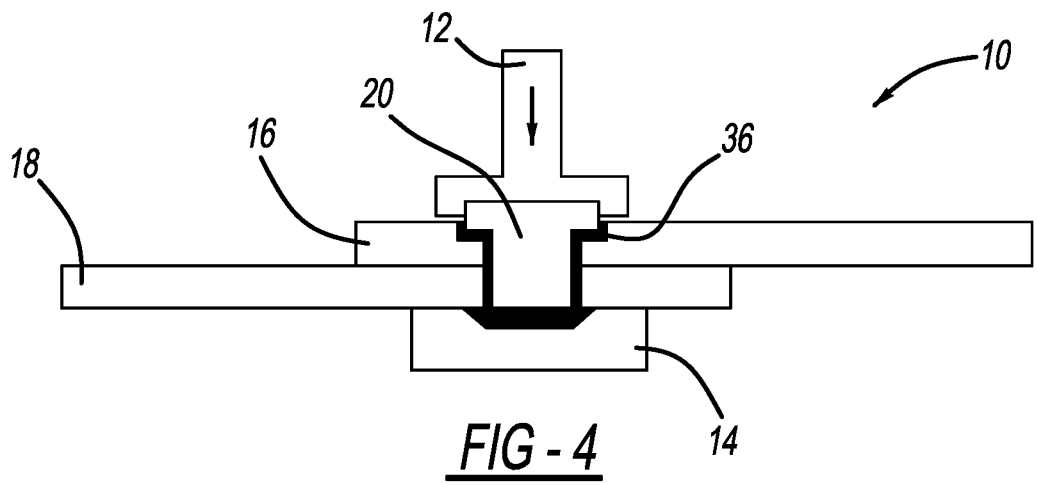

Referring now to FIG. 4, the fastener 20 continues to be pressed into the lower die 14. After a brief period of such friction stirring (i.e., rotating to generate heat), rotation of the tool 12 ceases, but the tool 12 continues to hold the fastener 20 under pressure for a short period so that the rivet forms to the substrates at all contact areas and finalizes its shape. The plasticized or stirred material hardens to form a spot weld. In other words, as the localized heated material zone 34 cools, a fused region 36 is created at an interface between the workpieces 16, 18 and the fastener 20. In this way, the mechanical joint is supplemented by the fused region 36. The fused region 36 contributes to the strength of the mechanical interface.

The fused region 36 is most conveniently achieved if both the workpieces 16, 18 are thermoplastic composite materials, having similar melting temperatures. However, the workpieces 16, 18 may be alternate materials, including materials different from one another, provided they are weldably compatible. The fused region 36 should be considered representative of a wide range of fused areas that may result from this process. Depending on the duration and magnitude of rotation of the tool 12, the extent of fused region 36 may vary. However, to strengthen the interface and ease the insertion of the fastener 20, at least a minimum localized heated material zone 34 should be developed around the circumference of shank 24.

The bottom surface of the lower workpiece 18 may also be subjected to the force of the lower die 14 as described herein, such that a portion of the surface of the lower workpiece 18 may also be modified to conform to the shape of the lower die 14. The complementary shape on the lower workpiece 18 may further assist in mechanically interlocking the workpieces 16, 18.

Figure 5:
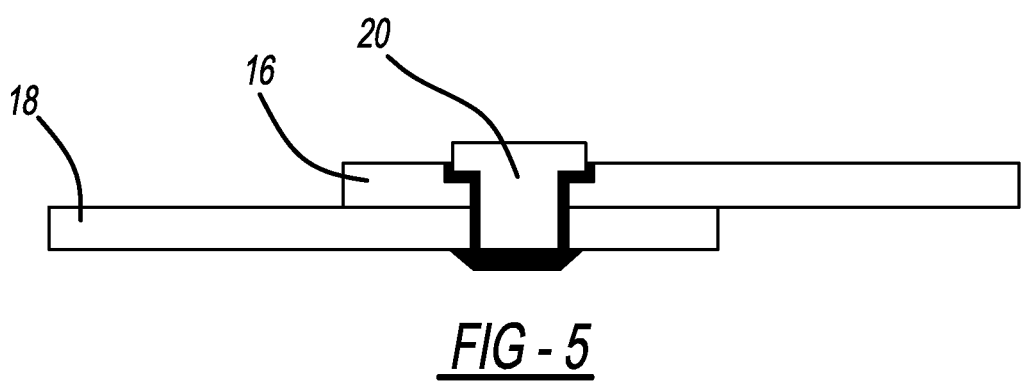
FIG. 5 is a schematic view of a joint formed by the hybrid joining machine using the hybrid joining process according to the present disclosure.

With reference now to FIG. 5, the tool 12 and lower die 14 are retracted from the riveted workpieces 16, 18. The tool 12 is then advanced to a next friction stir spot weld position on the material. The spot welds of this disclosure provide the mechanical fastening of riveting with the increased strength of material fusing between the workpieces 16, 18, capable of withstanding delamination and microcracking.

With reference now to FIGS. 6 through 9, another exemplary hybrid joining machine 100 incorporates a hybrid joining technique for polymeric composites, by a combination of friction stir blind riveting and material fusing. With reference to the drawings, wherein like reference numbers refer to like components, first and second workpieces 116, 118 are arranged such that first, upper workpiece 116 rests on the lower workpiece 118 (see FIG. 6). A friction stir tool 112 is securely held in a powered friction stir machine (not shown) and is adapted to locate a fastener 120 against one or more surfaces of the workpieces 116, 118. It should be noted that the drive mechanism of the present embodiment is specifically suited for blind riveting, such as with closed workpiece 118.

In particular, the blind rivet assembly includes the fastener 120 and a tool 140 having a mandrel 142. The fastener 120 includes a head portion 122 and an integrally formed hollow cylindrical shank 124. The mandrel 142 extends through the hollow shank 124 of the fastener 120 and has an enlarged mandrel head 144 at a distal end thereof. As can be seen, the mandrel 142 has a longer length than that of the fastener 120 so that the mandrel 142 extends well above the head portion 122. The mandrel head 144 is larger than the inner diameter of the hollow shank 124 of the fastener 120, such that the fastener 120 can be held securely on the mandrel 142. The mandrel 142 has a weakness, particularly a fracture notch 146 to define a fracture region in the mandrel 142, as will be discussed hereinafter.

The friction stir tool 112 is positioned in an attitude with a rotational axis of the tool aligned generally perpendicular to a spot weld site on the workpieces 116, 118. The friction stir machine is adapted to rotate the friction stir tool 112 with a high speed spin as indicated by the rotational arrow 130 (e.g., with a rotational speed of 1600 RPM). The friction stir machine advances the tool 112 while rotating the fastener 120.

With reference now to FIG. 7, the stir machine continues to advance the tool 112 so that the rotating shank 124 of the fastener 120 frictionally engages the workpiece 116 and generates heat at the surface thereof. The tool 112 may press the fastener 120 into the workpieces 116, 118 with a force, such as shown by directional arrow 132. It should be noted that other drive mechanisms may also be used for driving the fastener 120 into the workpieces 116, 118 (e.g., an electrically or hydraulically powered screw assembly, an actuator). The frictional contact between the rotating shank 124 and the stationary material of the respective workpieces 116, 118 generates intense local heating, such that the engaged material is plasticized at a localized heated material zone 134. Notably, the localized heated material zone 134 around the fastener 120 allows for enhanced riveting since local stresses and friction in this material zone are reduced. The plasticized material allows the shank 124 of the fastener 120 to easily penetrate the workpieces 116, 118, but also allows the material of the workpieces 116, 118 to fuse to the shank 124.

Referring now to FIG. 8, when the shank 124 of the fastener 120 extends completely through the workpieces 116, 118, the tool 112 continues spinning the fastener 120 and generating heat. At the same time, the tool 112 begins to forcibly draw the mandrel 142 upwardly (e.g., shown by directional arrow 148) so that the mandrel head 144 contacts a distal end of the shank 124. In this way, the mandrel head 144 works to axially collapse and radially expand the shank 124 to form an expanded head 150 that engages with the lower workpiece 118. Thus, the upper workpiece 116 and the lower workpiece 118 are tightly captured between the head portion 122 and the expanded head 150 of the shank 124, thereby fastening together the upper workpiece 116 and the lower workpiece 118. It should be understood that the tool 112 rotation can be stopped prior to the mandrel 142 removal; however, the material should still be warm enough to form the joint.

With reference now to FIG. 9, the mandrel 142 will move upward to a preset position and hold for a brief period after rotation of the tool 112 ceases so that the rivet forms to the substrates at all contact areas and finalizes its shape. The plasticized or stirred metal hardens to form a spot weld. In other words, as the localized heated material zone 134 cools, a fused region 136 is created at an interface between the workpieces 116, 118 and the fastener 120. In this way, the mechanical joint is supplemented by the fused region 136. The fused region 136 contributes to the strength of the mechanical interface. The fused region 136 is most conveniently achieved if both the workpieces 116, 118 are thermoplastic composite materials, having similar melting temperatures. However, the workpieces 116, 118 may be alternate materials, including materials different from one another, provided they are weldably compatible. The fused region 136 should be considered representative of a wide range of fused areas that may result from this process. Depending on the duration and magnitude of rotation of the tool 112, the extent of fused region 136 may vary. However, to strengthen the interface and ease the insertion of the fastener 120, at least a minimum localized heated material zone 134 should be developed around the circumference of shank 124. After the fused region 136 is formed, the upward force on the mandrel 142 increases such that the mandrel 142 fractures, as facilitated by the fracture notch 146.

With reference now to FIG. 10, the tool 112 and fractured mandrel 142 are retracted from the riveted workpieces 116, 118. The tool 112 is then advanced to a next friction stir spot weld position on the material. The spot welds of this disclosure provide the mechanical fastening of riveting with the increased strength of material fusing between the workpieces 116, 118, capable of withstanding delamination and microcracking.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. A method for joining a plurality of workpieces, comprising:
   providing a rotating drive tool;
   securing a fastener to the drive tool;
   wherein the drive tool further includes a stem portion and a mandrel head and the fastener includes a hollow shank, and wherein the stem portion of the drive tool extends through the hollow shank of the fastener with the mandrel head arranged at a distal end thereof;
   rotatably driving the drive tool such that a distal end of the fastener rotates against a surface of the plurality of workpieces, wherein the material assembly includes a first workpiece and a second workpiece, wherein the fastener, the first workpiece, and the second workpiece comprise a thermoplastic material;
   generating a heated material zone on the plurality of workpieces caused by friction from the rotation of the fastener against the surface of the plurality of workpieces that allows the thermoplastic material of the material assembly to fuse to the thermoplastic material of the fastener;
   rotatably and axially driving the distal end of the fastener through the heated material zone; and
   removing the drive tool from the fastener, wherein when the heated material zone cools, a portion of the heated material zone is fused to the fastener.

2. The method of claim 1, further comprising:
   deforming at least a portion of the heated material zone with the mandrel head, prior to removing the drive tool from the fastener.

3. The method of claim 2, wherein the stem portion of the drive tool further includes a fracture notch, and wherein removing the drive tool from the fastener includes fracturing the stem portion at the fracture notch.

4. The method of claim 1, wherein the mandrel head axially collapses and radially expands the hollow shank of the fastener into engagement with a lower surface of the material assembly to thereby attach the fastener and the material assembly.

5. A hybrid joining system comprising:
   a rotating drive tool having a stem portion and a mandrel head;
   a fastener having a hollow shank, the stem portion of the drive tool extending through the hollow shank of the fastener with the mandrel head arranged at a distal end thereof, the fastener being rotatably driven by the drive tool such that a distal end of the fastener rotates against a surface of a material assembly, wherein friction caused by the rotation of the fastener against the material assembly generates a heated material zone on the material assembly, and
   wherein the rotating drive tool rotatably and axially drives the distal end of the fastener through the heated material zone, and wherein at least a portion of the heated material zone is deformed by the mandrel head.

6. The hybrid joining system of claim 5, wherein the mandrel head axially collapses and radially expands the hollow shank of the fastener into engagement with a lower surface of the material assembly to thereby attach the fastener and the material assembly.

7. The hybrid joining system of claim 5, wherein the stem portion of the drive tool includes a fracture notch that is configured to fracture in order to remove the drive tool from the fastener.

8. The hybrid joining system of claim 5, wherein the material assembly includes a first and second workpiece and wherein the fastener is configured to join the first workpiece to the second workpiece; wherein the fastener, the first workpiece, and the second workpiece comprise a thermoplastic material; and wherein friction caused by the rotation of the fastener against the material assembly generates the heated material zone on the material assembly that allows the thermoplastic material of the workpieces to fuse to the thermoplastic material of the fastener.

9. The hybrid joining system of claim 8, wherein the proximal end of the fastener includes a head with a shank extending therefrom, and wherein the drive tool drives the shank through the first workpiece and into the second workpiece.

10. The hybrid joining system of claim 5, wherein at least a portion of the heated material zone on the material assembly is fused to the fastener upon cooling of the zone.

* * * * *